United States Patent
Shanmugasundaram et al.

(10) Patent No.: US 9,235,437 B2
(45) Date of Patent: Jan. 12, 2016

(54) METHOD AND INTEGRATION COMPONENT FOR INTEGRATING OSGI ENVIRONMENTS INTO A SERVICE-ORIENTED ARCHITECTURE

(71) Applicant: Software AG, Darmstadt (DE)

(72) Inventors: Karthik Shanmugasundaram, Ambasamudram (IN); Shanmugam Vairavan, Chennai (IN); Gary Woods, Seeheim (DE)

(73) Assignee: SOFTWARE AG, Darmstadt (DE)

( * ) Notice: Subject to any disclaimer, the term of this patent is extended or adjusted under 35 U.S.C. 154(b) by 215 days.

(21) Appl. No.: 13/872,413

(22) Filed: Apr. 29, 2013

(65) Prior Publication Data

US 2014/0173634 A1 Jun. 19, 2014

(30) Foreign Application Priority Data

Dec. 17, 2012 (IN) .......................... 1424/KOL/2012

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |

(52) U.S. Cl.
CPC .......... *G06F 9/465* (2013.01); *G06F 2209/461* (2013.01)

(58) Field of Classification Search
None
See application file for complete search history.

(56) References Cited

U.S. PATENT DOCUMENTS

| | | | |
|---|---|---|---|
| 2005/0154785 A1 | 7/2005 | Reed et al. | |
| 2008/0256225 A1* | 10/2008 | Suh et al. | ....................... 709/223 |
| 2012/0036252 A1 | 2/2012 | Shi et al. | |
| 2012/0246316 A1* | 9/2012 | Ramu et al. | ................... 709/226 |

FOREIGN PATENT DOCUMENTS

| | | |
|---|---|---|
| EP | 1 898 345 | 3/2008 |
| EP | 2 088 741 | 8/2009 |
| EP | 2088741 | * 12/2009 |

OTHER PUBLICATIONS

M. Psiuk et al., "Distributed OSGi Built Over Message-Oriented Middleware," Software—Practice and Experience, Softw. Pract. Exper. 2013 43:1-31, Dec. 8, 2011.
E. Curry, "Message-Oriented Middleware," in Middleware for Communications (Q. Mahmoud, ed.), Jan. 2004, XP007911233.
D. Donsez, et al., "Propagation d'événements entre passerelles OSGi," Sep. 22, 2006 (2 pages with partial English translation).

(Continued)

*Primary Examiner* — Emerson Puente
*Assistant Examiner* — Kacy Verdi
(74) *Attorney, Agent, or Firm* — Nixon & Vanderhye P.C.

(57) ABSTRACT

Certain exemplary embodiments relate to a method for integrating at least one Open Services Gateway initiative (OSGi) environment into a Service-oriented Architecture (SOA). The OSGi environment includes at least one OSGi object, and the SOA includes a SOA registry. The method includes publishing the at least one OSGi object to the SOA registry. The publishing includes creating an SOA object in the SOA registry corresponding to the at least one OSGi object. The SOA object includes information reflecting at least one relationship of the at least one OSGi object to at least one further OSGi object within the OSGi environment.

18 Claims, 4 Drawing Sheets

(56) References Cited

OTHER PUBLICATIONS

Figure 1:
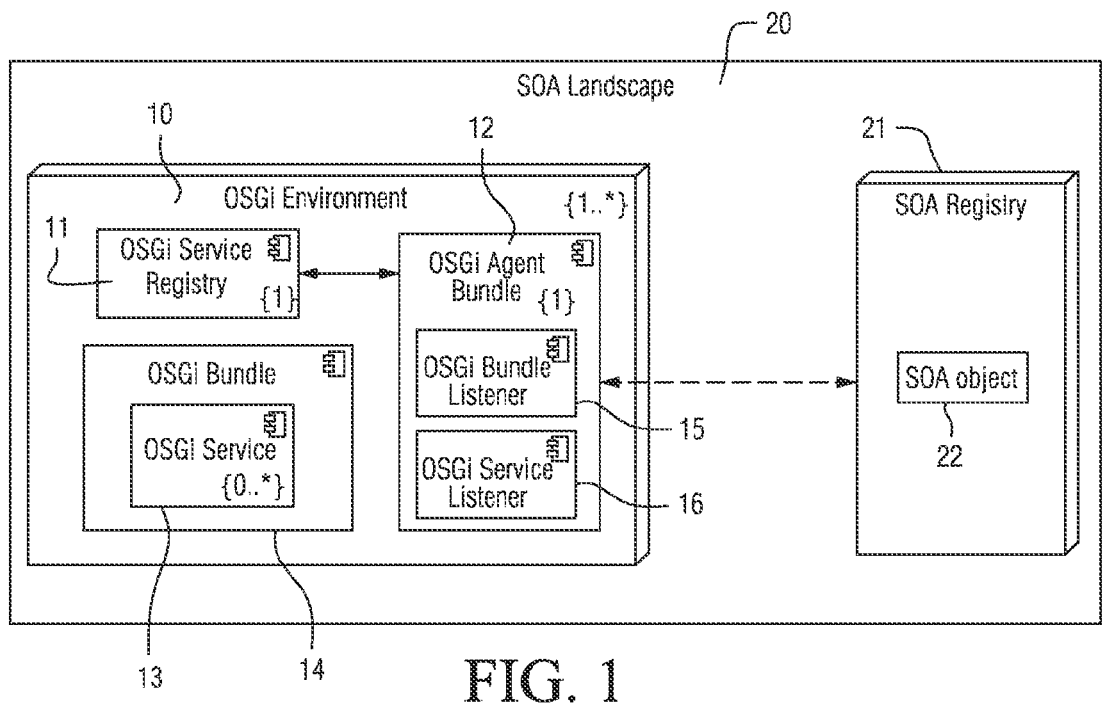

A. Koschel, et al., "Asynchronous Messaging for OSGi," Proceeding of the ITI 2012 34$^{th}$ Int. Conf. on Information Technology Interfaces, Jun. 25-28, 2012, pp. 99-104.
Gelibert, A., et al., "Clustering OSGi Applications Using Distributed Shared Memory," IEEE, May 9, 2011 (8 pages).
Wikipedia, "Service-oriented architecture", 20 pages, printed on Apr. 26, 2013.
Wikipedia, "SOA Governance", 3 pages, printed on Apr. 26, 2013.
OSGi Alliance, Wikipedia, "OSGi Framework", (Jun. 5, 2012), 11 pages.
Adler, M. et al., "Endberich: Clouds—Peerbasiertes On-Demand Computing", 84 pages, (Mar. 31, 2010), with English-translation, 87 pages.
Rellermeyer, J.S. et al., "Services Everywhere : OSGi in Distributed Environments", ECLIPSECON 2007, (Mar. 5-8, 2007), 9 pages.
Gelibert, A. et al., "OSGi Applications Clustering using Distributed Shared Memory", 11$^{th}$ Annual Conference on New Technologies of Distributed System, 25 pages, printed Mar. 1, 2013.
Gelibert, A. et al., "Clustering OSGi Applications using Distributed Shared Memory", 8 pages, printed Mar. 1, 2013.
U.S. Appl. No. 13/782,426, filed Mar. 1, 2013, Peev.

* cited by examiner

Fig. 5

```
<OsgiAgentConfiguration>
    ...
    <Processor>com.sampleorg.osgi.agent.SampleProcessor</Processor>
    ...
    <SoaRegistry>
        ...
        <Url>http://localhost:8080/registry</Url>
        <Username>sampleuser</Username>
        <Password>{Encrypted password}</Password>
        <OsgiBundle>
            ...
            <Filters>
                <Filter>{Location A}</Filter>
                <Filter>{Location B}</Filter>      → 200
                ....
            </Filters>
            ...
        </OsgiBundle>
        <OsgiService>
            ...
            <Filters>
                <Filter>{Interface A}</Filter>
                <Filter>{Interface B}</Filter>     → 300
                ...
            </Filters>
            ...
        </OsgiService>
        ...
    </SoaRegistry>
    <OsgiGovernance>
        <Log>{Log File Location}</Log>
        <Notification>{Email address}</Notification>
        ...
        <Bundle>
            ...
            <stateMapping>
                <SoaRegistry>ACTIVE</SoaRegistry>
                <Osgi>ACTIVE</Osgi>
                <Service>Approved</Service>
            </stateMapping>
            ...                                    → 400
            <StageMapping>
                <SoaRegistry>Development</SoaRegistry>
                <Osgi>Development</Osgi>
            </StageMapping>
            ...
            <deploy>
                <SoaRegistry>ACTIVE</SoaRegistry>
                <Service>Approved</Service>        → 500
            </deploy>
            ...
        </Bundle>
        ...
    </OsgiGovernance>
</OsgiAgentConfiguration>
```

METHOD AND INTEGRATION COMPONENT FOR INTEGRATING OSGI ENVIRONMENTS INTO A SERVICE-ORIENTED ARCHITECTURE

This application claims priority to IN Application No. 1424/KOL/2012, filed Dec. 17, 2012, the entire contents of which is hereby incorporated by reference.

1. TECHNICAL FIELD

Certain exemplary embodiments relate to a method and integration component for integrating at least one Open Services Gateway initiative (OSGi™) environment into a Service-oriented Architecture (SOA).

2. BACKGROUND AND SUMMARY

Nowadays, complex computations are typically executed by means of a plurality of distributed computer systems which communicate over networks, such as the Internet. In such a scenario, each computer is in charge of certain functionality and the computers invoke each other's functionalities to collectively accomplish the overall computation.

One methodology for realizing such a distributed processing is called service-oriented architecture (SOA). Generally speaking, SOA comprises principles and methodologies for the design, development and operation of software as interoperable services. That is, each application running on a certain computer system registers its provided functionality as a so-called service in a central SOA registry. Other services can then query the SOA registry, retrieve an interface definition of a suitable service and invoke that service. The concept of SOA is increasingly popular due to the loose coupling between the services, which leads to computer systems which are particularly flexible to adaptations and changes. Further, a SOA allows for the interworking of heterogeneous systems, i.e. systems that are based on different software, programming languages, hardware and/or operating systems, since such heterogeneous systems are enabled to interact with one another via the well-defined interfaces registered in the SOA registry.

Those skilled in the art will appreciate that controlling the correct operation of a large SOA-based system is a complex and difficult task, while catastrophic impacts on the overall SOA system can arise already if one single service does not operate as expected. For example, consider a SOA-based system that operates an assembly line e.g. for the manufacturing of vehicles. If one service of the SOA does not operate as expected, this could lead to a complete halt of the assembly line or even to damages to the produced vehicles. Another example involves a SOA that operates an air traffic control system in an airport. If one service in the SOA does not operate as expected, this could have catastrophic consequences for the managed airport, possibly even involving plane crashes in the worst case.

Therefore, various approaches have been proposed in the prior art for controlling the correct operation of a SOA, i.e. to ensure that all participants (such as services) in the SOA operate as expected. These approaches for controlling the correct operation of a SOA are commonly referred to as "SOA governance" and include among others ensuring that all SOA components interact properly in terms of communication patterns, security rules, response times and/or other performance characteristics (quality of services), ensuring that changing a service does not impose unforeseen consequences on service consumers (change management) and/or ensuring that services evolve within the system only in a controlled manner (lifecycle management).

One way of implementing a certain subsystem of a SOA in the programming language Java is provided by a dynamic and modularized architecture model called OSGi (Open Services Gateway initiative. OSGi is a module system and service platform for the Java programming language implementing functional components (referred to as OSGi objects) in the form of bundles and services in an OSGi environment. OSGi services are Java object instances, registered into the OSGi framework. Any Java object can be registered as a service, but typically it implements a well-known interface. OSGi bundles can be used to group one or more OSGi services and are typically specified as jar components with extra manifest headers. The functional components (i.e. bundles and services) are typically managed using a service registry of the respective OSGi environment.

US patent application publication no. 2012/0036252 A1 discloses an OSGi-based heterogeneous service integrating system, which is used for publishing OSGi service endpoints to a remote registry for discovery purposes. Further, US patent application publication 2005/0154785 A1 provides a method and system of mapping at least one web service to at least one OSGi service and exposing at least one local service as at least one local web service. The document describes exposing an OSGi service as a web service to make the service consumable outside the OSGi environment.

However, while the above-discussed prior art approaches allow for making OSGi-based systems usable within a SOA, the proposed prior art systems lack the ability of efficiently and reliably controlling the correct operation of a SOA once the OSGi part has been integrated.

It is therefore the technical problem underlying certain exemplary embodiments to provide an approach for integrating at least one OSGi environment into a Service-oriented Architecture in such a manner that the correct operation of the SOA can be efficiently and reliably controlled, thereby at least partly overcoming the above explained disadvantages of the prior art.

This problem is according to one aspect of the invention solved by a method for integrating at least one Open Services Gateway initiative (OSGi) environment into a Service-oriented Architecture (SOA), wherein the OSGi environment comprises at least one OSGi object and wherein the SOA comprises a SOA registry. In the embodiment of claim 1, the method comprises the steps of:

a. publishing the at least one OSGi object to the SOA registry; wherein b. the publishing comprises creating an SOA object in the SOA registry corresponding to the at least one OSGi object, wherein the SOA object comprises information reflecting at least one relationship of the at least one OSGi object to at least one further OSGi object within the OSGi environment.

Accordingly, the embodiment defines a method for enabling a proper exercise of control over at least one OSGi object in the OSGi environment using a SOA registry as central control component (SOA governance). To this end, the at least one OSGi environment is integrated in a SOA in that the at least one OSGi object is published to the SOA registry. Importantly, not only the OSGi object itself is published to the SOA registry, but also its relationships to other OSGi objects. Optionally, also other information, such as metadata, can be published with the OSGi object. Publishing of the OSGi object with its relationship(s) to other OSGi objects is an important prerequisite for the achievement of operational control, since it enables e.g. to perform impact analyses on the OSGi object and its relationships, i.e. analyses of how a change to the OSGi object affects the other objects.

The present method for enabling SOA governance further provides the essential capability to govern a multitude of OSGI objects in OSGi environments with one SOA registry. One central control component in huge software platforms is indispensable to reduce complexity and to keep the performance.

In one aspect of the present invention, the OSGi object comprises information indicating a lifecycle state and/or lifecycle stage of the OSGi object, and wherein the corresponding SOA object comprises information indicating a corresponding lifecycle state and/or lifecycle stage of the SOA object.

Accordingly, SOA governance in the SOA registry can be applied on the lifecycle of the OSGi object in one aspect of the invention. Examples of lifecycle states of the objects of an OSGi environment include a development state, a testing state, a preproduction state and/or a production state. The lifecycle state of the OSGi object is then mapped to the lifecycle state of the corresponding SOA object (as instance of the OSGi object) in the SOA registry. This way, the SOA registry can govern the transition of the OSGi object from one lifecycle state to another lifecycle state, i.e. a lifecycle state change of the OSGi object can be controlled e.g. by means of policies defined on transitions between lifecycles in the SOA registry. As an example of governance, installation and uninstallation of the OSGI object requires an approval in the SOA registry. Hence, one SOA registry is enabled to control the state of one or multiple OSGi objects.

In a further aspect, the OSGi object comprises information indicating a version of the OSGi object, and wherein the corresponding SOA object comprises information indicating the version of the OSGi object. Accordingly, the version of the OSGi object is mapped to the version of the corresponding SOA object in the SOA registry. For example, the uninstallation of the OSGi object with a specific version may lead to deleting the specific version of the corresponding SOA object (and only that version) in the SOA registry.

It will be appreciated that in certain exemplary embodiments only one, only a subset, or any combination of the above-explained information (relationships, lifecycle states, versions) is published into the SOA registry.

In another aspect of the present invention, the method comprises the further steps of detecting that an OSGi object has been installed in the OSGi environment, and creating a corresponding SOA object in the SOA registry. Also, the method may comprise the further steps of detecting that an OSGi object has been updated in the OSGi environment, and updating the corresponding SOA object in the SOA registry. Lastly, the method may also comprise the further steps of detecting that an OSGi object has been uninstalled in the OSGi environment, and deleting the corresponding SOA object in the SOA registry.

Accordingly, further changes, besides lifecycle and version, of the OSGi object are noticed including installation, update and uninstallation. For example whenever a new object has been installed, it is of importance that the corresponding SOA object is created in the SOA registry. Likewise when an object has been uninstalled the corresponding SOA object is deleted in the SOA registry. The adjustment of the OSGi object with the SOA object in the SOA registry is essential to assure equal states of the objects and accurate governance in the SOA registry over currently changed OSGi objects. The fine tuning of adjustment may be handled e.g. with configuration settings.

In a preferred embodiment, the above detecting steps comprise receiving an event from the OSGi environment indicating that the corresponding OSGi object has been installed, updated and/or uninstalled in the OSGi environment. Accordingly, certain exemplary embodiments passively listen for changes in the OSGi environment and synchronize such changes to the SOA registry when a corresponding event is received, which has minimal impact on the operation of the OSGi environment (as compared to actively querying the OSGi environment e.g. in regular intervals).

In yet another aspect, the method comprises the further steps of detecting that an SOA object has been created, updated and/or deleted in the SOA registry, and installing, updating and/or uninstalling a corresponding OSGi object in the OSGi environment. Accordingly, the synchronization not only takes place in the direction from the OSGi environment to the SOA registry, but also in the inverse direction, leading to a fully synchronized integration of the OSGi environment into the SOA.

In one embodiment, the detecting comprises receiving a command from the SOA registry for installing, updating and/or uninstalling the corresponding OSGi object in the OSGi environment. Accordingly, certain exemplary embodiments again passively wait for being provided with a command from the SOA registry to perform the respective action on the OSGi environment, i.e. the SOA triggers the respective action (so-called push approach from the SOA registry). Alternatively, the detecting may comprise querying the SOA registry, preferably periodically, whether an SOA object has been created, updated and/or deleted in the to SOA registry (so-called pull approach from the OSGi environment).

Generally, the at least one OSGi object may be an OSGi bundle or an OSGi service. As already explained further above, OSGi is a module system organized in functional modules in the form of OSGi services and OSGi bundles grouping OSGi services. The present method can then be applied individually on the functional modules.

Furthermore, certain exemplary embodiments also provide a computer program comprising instructions for implementing any of the above-described methods.

Certain exemplary embodiments are also directed to an integration component for integrating at least one Open Services Gateway initiative (OSGi) environment into a Service-oriented Architecture (SOA), wherein the OSGi environment comprises at least one OSGi object and wherein the SOA comprises a SOA registry, wherein the integration component comprises:

a. means for publishing the at least one OSGi object to the SOA registry; wherein
b. the means for publishing is adapted for creating an SOA object in the SOA registry corresponding to the at least one OSGi object, wherein the SOA object comprises information reflecting at least one relationship of the at least one OSGi object with at least one further OSGi object within the OSGi environment.

Accordingly, the provided integration component (hereinafter also referred to as OSGi agent; which is preferably an OSGi bundle itself) can be understood as a gateway that integrates the OSGi world and the SOA world, as explained in connection with any of the above methods. Further advantageous modifications of embodiments of the integration component of certain exemplary embodiments are defined in further dependent claims.

Lastly, certain exemplary embodiments also relate to a Service-oriented Architecture (SOA) comprising a SOA registry, at least one Open Services Gateway initiative (OSGi) environment, and an integration component as disclosed above.

3. BRIEF DESCRIPTION OF THE DRAWINGS

Figure 2:
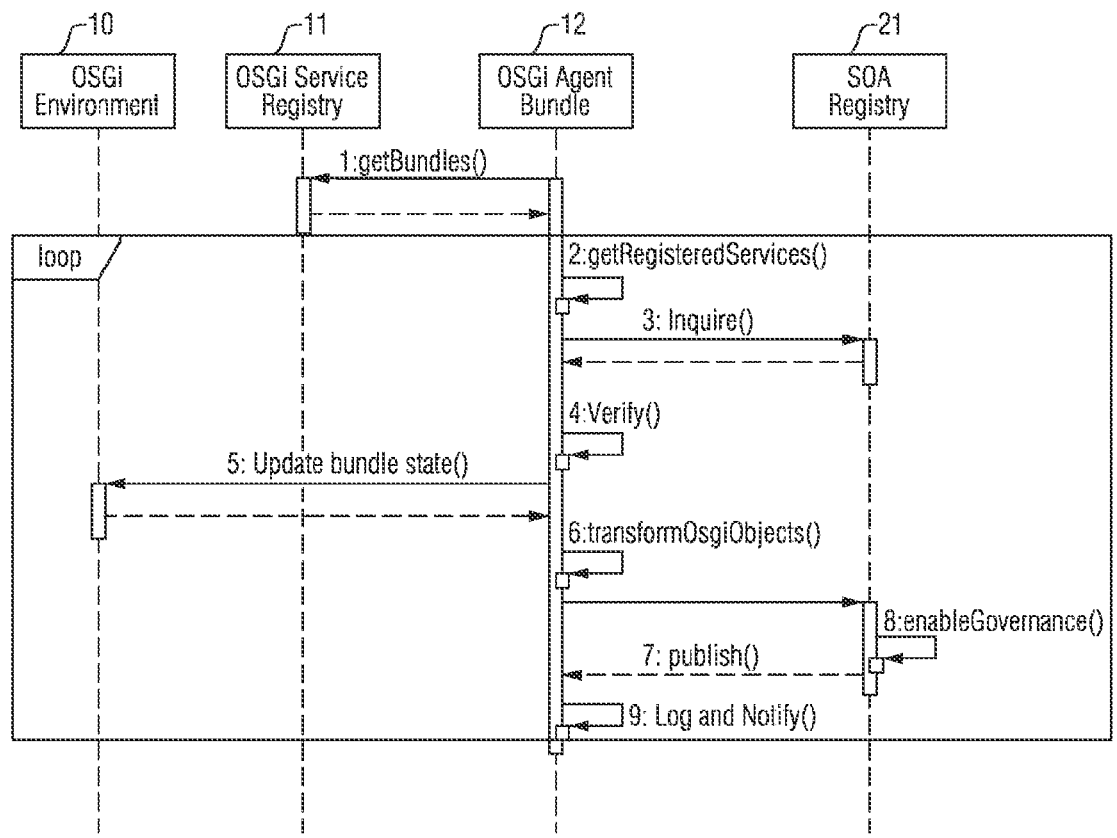
Figure 3:
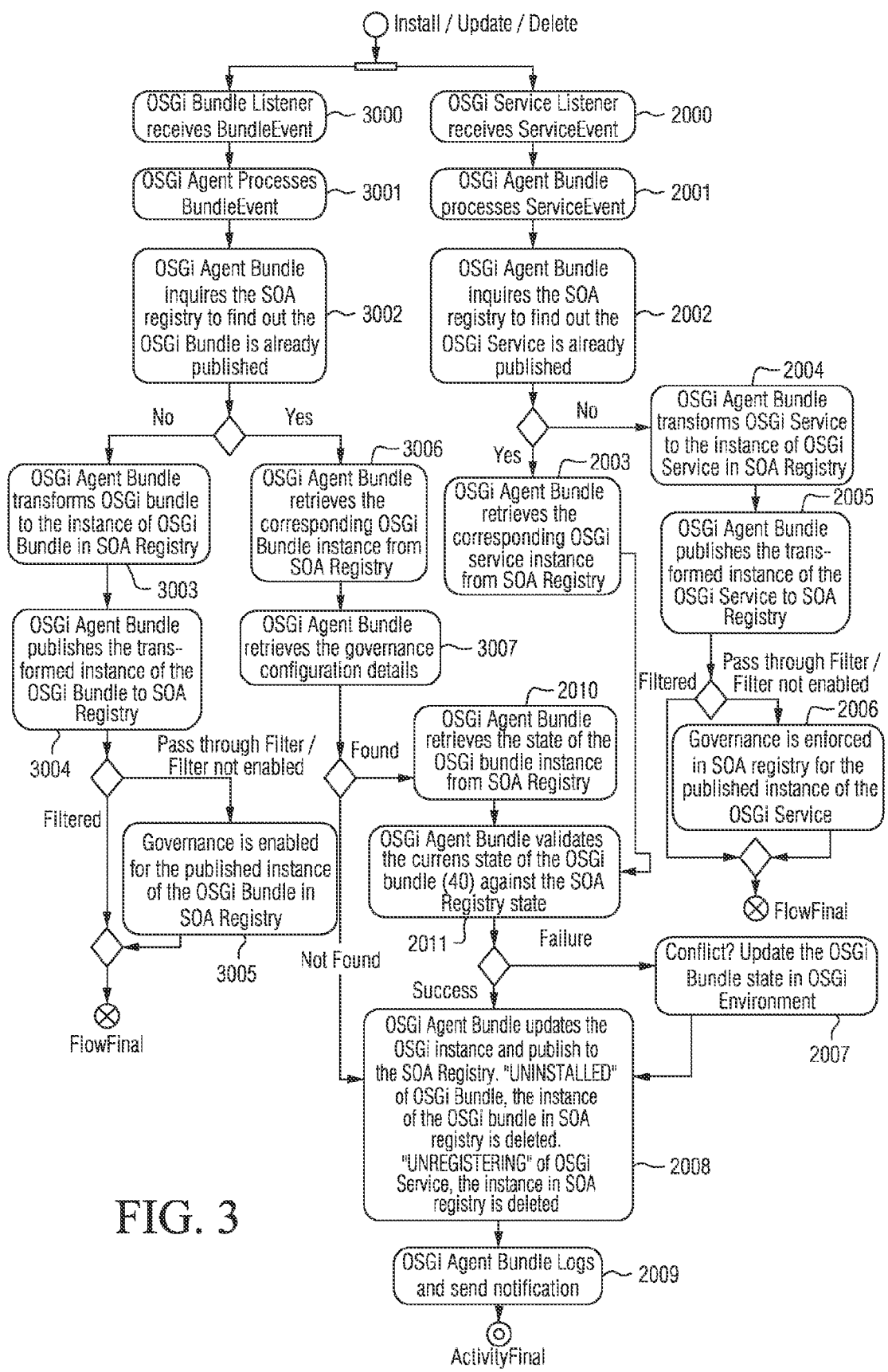
Figure 4:
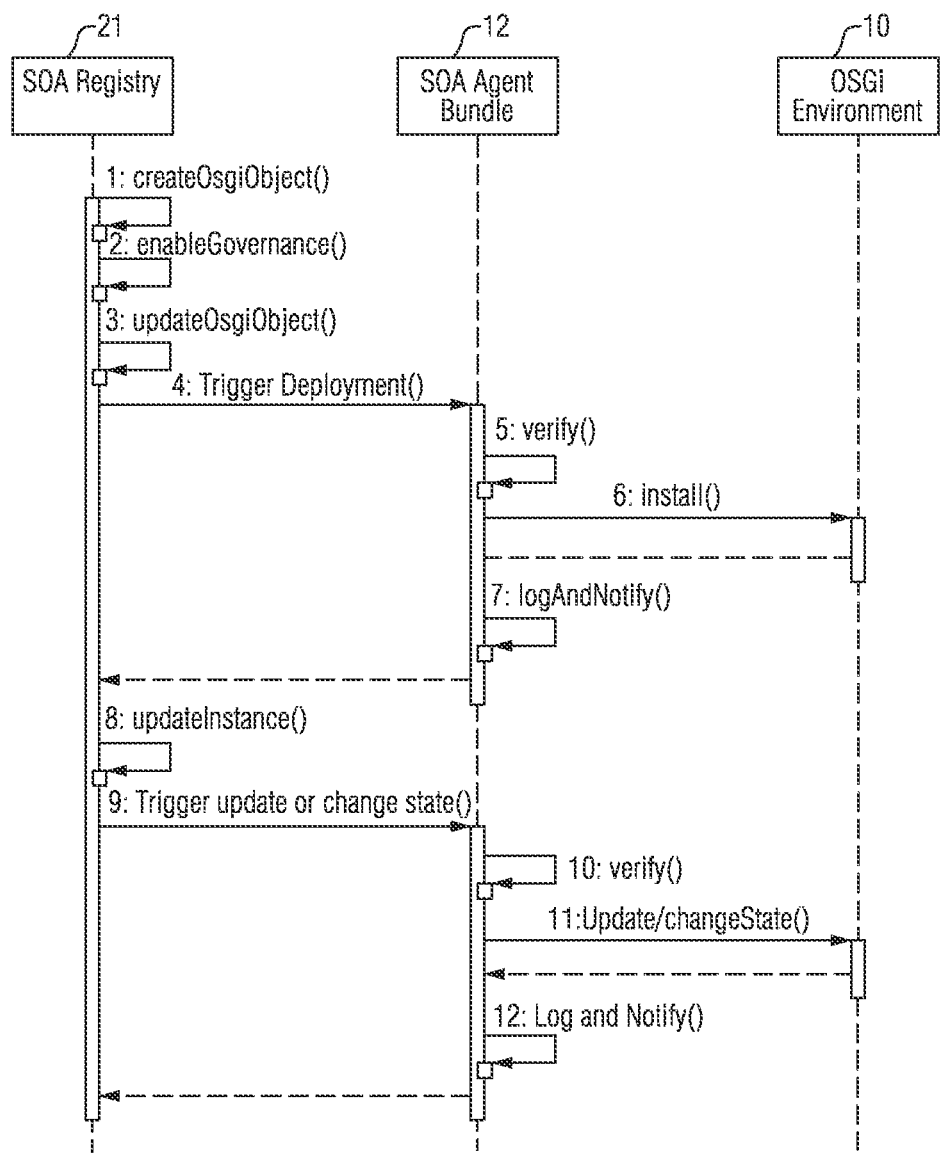

In the following detailed description, presently preferred embodiments of the invention are further described with reference to the following figures:

FIG. 1: A schematic representation of a simplified SOA landscape comprising one or more OSGi environments and a SOA registry for managing information relating to the SOA in accordance with one embodiment of the invention;

FIG. 2: A schematic diagram illustrating a method for publishing OSGi objects from an OSGi environment to a SOA registry in accordance with one embodiment of the invention;

FIG. 3: A schematic diagram illustrating a control flow of activities when a bundle is deployed/updated/deleted in the environment described in FIG. 1;

FIG. 4: A schematic diagram illustrating a method for creating OSGi objects from the scratch in an SOA registry, enabling governance in the SOA registry and then deploying the OSGi bundle into the OSGi environment in accordance with one embodiment of the invention; and FIG. 5: An exemplary configuration file used by an SOA Agent implementation in accordance with one embodiment of the invention.

4. DETAILED DESCRIPTION

In the following, preferred embodiments of the invention are described with reference to an exemplary OSGi environment 10 and a SOA registry 21 in a simplified SOA landscape 20 as schematically shown in FIG. 1. As indicated in FIG. 1, a SOA landscape 20 may comprise one or more {1 . . . *} OSGi environments 10. In each OSGi environment to, an OSGi Service registry 11 is typically present and one or more {1 . . . *} OSGi bundles 14 are deployed. Each OSGi bundle 14 may comprise zero or more {0 . . . *} OSGi services 13. OSGi bundles 14 and OSGi services 13 are also commonly referred to as OSGi objects.

As also shown in FIG. 1, certain exemplary embodiments provide an integration component 12 which integrates the exemplary OSGi environment 10 into the SOA 20. The integration component 12 (hereinafter also interchangeably referred to as "OSGi Agent" 12 or "OSGi Agent bundle" 12) of FIG. 1 is preferably an OSGi bundle 14 itself deployed as part of certain exemplary embodiments. In a preferred implementation, the OSGi Agent 12 comprises an OSGi Bundle listener 15 and/or an OSGi Service listener 16 implementation. The OSGi Agent 12 retrieves the OSGi bundles 14 and/or OSGi services 13 data, preferably from the OSGi Service registry 11, and publishes the data to the SOA registry 21. This is illustrated in FIG. 1 by means of the SOA object 22, which serves as a representation of the corresponding published OSGi object 13, 14 within the SOA registry 21. Governance can then be enforced on the OSGi objects in the OSGi environment to and/or in the SOA registry 21.

Preferred Implementation of Setting Up the Integration Component 12

In an exemplary implementation, certain exemplary embodiments are used together with an SOA registry 21 which can be managed with the well-known Java API (Application programming interface) for XML Registries (JAXR). Instances of the JAXR objects may hold additional custom properties. In addition, the registry may have preferably classification capabilities for the entities it describes, that is, the capability to organize categories into hierarchical taxonomies for classifying the entries. Further, the registry preferably comprises capabilities to define directed relationships between entities. In the case of a registry manageable by JAXR, the relationships are called associations, wherein the associations themselves are typed and can carry properties.

In one embodiment, a prerequisite is to create an OSGi Agent bundle 12. The OSGi Agent 12 is the core component of the integration of the OSGi environment to and the SOA registry 21. In a preferred embodiment, the OSGi Agent bundle 12 contains implementations of the following interfaces provided by the OSGi framework:
"org.osgi.framework.BundleActivator",
"org.osgi.framework.BundleListener" and
"org.osgi.framework.ServiceListener".

For example, the OSGiAgentBundleListener java class may implement the BundleListener interface. It then receives events of type org.osgi.framework.BundleEvent generated by the OSGi environment asynchronously and processes the events:

```
...
import org.osgi.framework.ServiceEvent;
import org.osgi.framework.BundleListener;
...
public class OSGiAgentBundleListener implements
BundleListener {
    ...
    public void bundleChanged(BundleEvent event) {
        //Process the event
        ...
    }
}
```

To receive events synchronously, the class implementation should implement the interface "org.osgi.framework.SynchronousBundleListener". As the person skilled in the art will appreciate, the lifecycle processing of a bundle will not proceed until the registered synchronous listeners are completed. The state change lock will not allow a custom modification of the bundle state in synchronous listeners. For example, it may be necessary to roll back to a configured state if the states of the bundle in the OSGi environment and the SOA registry are not equal. This is not possible with synchronous listeners. Asynchronous listeners, on the other hand, will be called only after the lifecycle state change is completed and thus one could modify the state to a configured value if needed.

The OSGiAgentServiceListener java class implements the ServiceListener interface. It receives the org.osgi.framework.ServiceEvent generated by the OSGi environment asynchronously and processes the event:

```
...
import org.osgi.framework.ServiceEvent;
import org.osgi.framework.ServiceListener;
...
public class OSGiAgentServiceListener implements
ServiceListener {
    ...
    public void serviceChanged(ServiceEvent event) {
        //Process the event
        ...
    }
}
```

The OSGiAgentBundleActivator class implements the interface BundleActivator and comprises an implementation for start( ) and stop( ) operations. During the start( ) operation, the BundleListener instance and ServiceListener instance are registered in the BundleContext:

```
...
    import org.osgi.framework.BundleActivator;
    import org.osgi.framework.BundleContext;
    import org.osgi.framework.BundleListener;
    import org.osgi.framework.ServiceListener;
    ...
    public class OSGiAgentBundleActivator implements
BundleActivator {
    ...
        private BundleListener bundleListener;
        private ServiceListener serviceListener;
    ...
        public void start(BundleConext context) throws
Exception {
        ...
            //Add the BundleListener
            bundleListener = new
OSGiAgentBundleListener( );
            context.addBundleListener(bundleListener);
        ...
            //Add the ServiceListener
            serviceListener = new
OSGiAgentServiceListener( );
            context.addServiceListener(serviceListener);
        ...
            //process the bundles
        }
        public void stop(BundleContext context) throws
Exception {
        ...
            //Remove the BundleListener
            context.removeBundleListener(bundleListener);
            //Remove the ServiceListener
            context.removeServiceListener(serviceListener);
        }
    }
```

Moreover, in a preferred embodiment, an EventProcessor implementation in the OSGi Agent bundle 12 processes events of the types BundleEvent and ServiceEvent retrieved through corresponding listeners called OSGi Bundle Listener 15 and OSGi Service Listener 16.

The OSGi Agent bundle 12 MANIFEST.MF is typically located in the META-INF folder. The MANIFEST.MF comprises manifest headers that contain descriptive information about the OSGi Agent bundle 12 (cf. "OSGi Service Platform Core Specification", The OSGi Alliance, Release 4, Version 4.3, April 2011, section 3.2.1 for examples). In a preferred embodiment, the OSGi Agent bundle 12 can be digitally signed to secure the bundle and target a set of bundles by principal for permission to operate on or with those bundles.

Once the deployed OSGi Agent bundle 12 becomes active, the BundleActivator implementation registers the OSGi Bundle Listener 15 and OSGi Service Listener 16 in the execution context.

Publishing OSGi Objects to the SOA Registry

FIG. 2 illustrates a method for publishing OSGi objects 13, 14 from the OSGi environment to and governing the published OSGi objects 13, 14 in the SOA registry 21 once the OSGi Agent 12 was installed and started.

Preferably, in step 1 the OSGi Agent Bundle 12 invokes the OSGi Service registry 11 (cf. FIG. 1) to retrieve a subset of a plurality of OSGi bundles 14 and/or OSGi services 13 based e.g. on security permissions defined in the respective OSGi bundle 14 and/or OSGi service 13. This aspect of security enablement is optional. If security is not enabled, all the OSGi bundles 14 in the OSGi environment 10 can be retrieved. Also, filters may be applied on the retrieved bundles 14 to select the desired bundles 14 that have to be published to the SOA registry 21.

Looking more in detail at FIG. 2, the steps 2 to 7 are repeated for each bundle 14 retrieved in the previous step. In step 2, the registered services 13 are retrieved from the respective OSGi bundle 14. Optionally, filters can be applied also in the services 13 retrieval. Step 3 inquires the SOA registry 21 to find out if the instance (i.e. the SOA object 22 to be created in the SOA registry 21 in order to represent the published OSGi object 13, 14) is already present.

In step 4 of FIG. 2, if the instance is not present, then no verification is performed. Otherwise, if the instance is already present then the current state of the instance (i.e. the SOA object 22) in the SOA registry 21 is also retrieved.

If a Lifecycle stage is configured, then the stage information is retrieved. The OSGi Agent bundle 12 verifies the lifecycle state and/or lifecycle stage information of the SOA registry 21 instances with the lifecycle state and/or lifecycle stage information of the OSGi environment to OSGi entities based on the configuration. In step 5, if there is any mismatch then a configured operation will be performed by the OSGi bundle 14. For example, in the configuration file of FIG. 5 (cf. section 400) describes that if the OSGi Bundle 14 state is ACTIVE, then the corresponding state in the SOA registry 21 should be ACTIVE. Also, all the registered OSGi services 13 instances of the OSGi bundle 14 instance should be in an approved state. Moreover, the lifecycle stage of the SOA Registry 21 and to the OSGi environment to should be "Development". If any of these criteria do not match, then the bundle state is updated to "RESOLVED" (as per OSGI Bundle Lifecycle state specification) in the OSGi environment 10. In the above example, "RESOLVED" is assumed to be a state prior to "ACTIVE". Accordingly, if the lifecycle states/stages are not matched then it simply moves back to the previous state.

With respect to the above described lifecycle aspect, the person skilled in the art will appreciate that any number of lifecycle states may be defined in accordance with requirements of the organization implementing the SOA. Further, a lifecycle stage is to be understood as a grouping of several lifecycle states. Generally, the terms used herein in this context are to be understood as also used in European patent No. 1 898 345 B1 of applicant, which is titled "System for managing the lifecycle of a service oriented architecture".

Returning to FIG. 2, step 6 comprises transforming the OSGi Bundle 14 and registered OSGi Services 13 for that bundle in to the SOA registry 21 specific instances (i.e. SOA object(s) 22). To this end, a presently preferred embodiment of the invention provides a mapping of meta-data of an OSGi Bundle 14 and/or OSGi Service 13 to a meta-data representation in the SOA registry 21. The created SOA registry 21 instances (i.e. SOA object(s) 22) are updated with this meta-data. An example of the provided mapping is shown in the table at the end of the description.

In case of step 5 execution, the existing instance in the SOA registry 21 will be updated with modified state information in OSGi environment 10.

In a preferred embodiment, the OSGi Agent 12 maps dependencies between the OSGi objects 13, 14 in the OSGi environment to as association objects between the OSGi instances (i.e. SOA objects 22) in the SOA registry 21 as described in the table at the end of the description.

For example, an OSGi bundle 14's "Requirements" are identified using the Bundle wiring API. Association objects with association type as 'Consumes' category are created between the required bundle instance and the required bundle instances and published to the SOA registry 21. The "Capabilities" of an OSGi bundle 14 that are required by other OSGi bundles 14 are identified using the Bundle wiring API. Association objects with association type as "Consumed By" category are created between the provider bundle instance and the required bundle instances and published to the SOA registry 21. In another embodiment, the requirements and capabilities are created as a single association object between two bundles and the association type has forward labels as 'Consumes' and reverse labels as "Consumed By". In another embodiment, the association type can be a custom category with a single label or both forward label and reverse label.

The relationship of an OSGi bundle 14 and its registered OSGi Services 13 are mapped as association objects in the SOA registry 21. The source of the association object is the OSGi bundle 14 instance and the target of the association object is the OSGi service 13 instance with association type as 'Registers' category. In another embodiment, the association type can be a custom category with single label or both forward label and reverse label.

The ExportedPackages interface is deprecated from OSGi specification 4.3 API. The exported packages of a bundle and its consuming bundles relationships can be specified as association. Using a PackageAdmin instance, one could retrieve the exported packages of the given bundle. For each exported package, there is an array of importing bundles. The association objects between the exporting bundle and the importing bundles are created with association type "Exports" category. The name of the association object is the ExportPackage name. In another embodiment, the association type can be a custom category with single label or both forward label and reverse label.

If an OSGi bundle 14 uses one or more OSGi services 13, association objects are created between the OSGi bundle 14 instance and the OSGi service 13 instance with association type as 'Uses' category. If the association objects are created from OSGi service 13 instance(s) to the OSGi bundle 14 instances the association type as "Used By" category is used. In another embodiment, the association type can be a custom category with single label or both forward label and reverse label.

In another embodiment, the association objects between instances can be SOA registry 21 specific implementations.

Again with reference to FIG. 2, in step 7 the current instance is published to the SOA Registry 21. In step 8, the governance is enabled in the newly created instances in the SOA Registry 21. Optionally, in step 9, the OSGi Agent 12 bundle logs the publish information and sends an email notification to a configured email address or addresses.

In another embodiment, filters can be applied on the OSGi Bundle 14 and/or OSGi service 13 instances that are published to the SOA registry 21. For example, in FIG. 5, the <Filters> XML element 200 is a child element of <OsgiBundle> and describes the locations using which the bundles 14 are filtered (cf. "OSGi Service Platform Core Specification", The OSGi Alliance, Release 4, Version 4.3, April 2011, section 4.4.1 for examples). Similarly, the <Filters> XML element 300 is a child element of <OsgiService> describes the interfaces using which the services 13 are filtered.

Event-Based Implementation of the OSGi Agent 12

The OSGi bundle events and/or OSGi Service events are generated when a OSGi bundle is installed or updated or deleted in the OSGi environment. FIG. 3 describes the flow of the activities when an OSGi Event 14 and/or Service Event 13 are received in the OSGi Bundle Listener 15 or the OSGi Service Listener 16 respectively (cf. steps 2000 and 3000, respectively). When the registered OSGI Bundle listener 15 receives the Bundle Event from the OSGi environment 10 (step 3000), it sends the BundleEvent to the OSGi Agent bundle 12 (step 3001). The OSGi Agent 12 inquires the SOA registry to find out the instance of OSGi bundle is already published in SOA registry (step 3002). If the instance of OSGi bundle is not present in SOA registry, the instance of OSGi bundle is created by transforming (step 3003) the OSGi bundle as described earlier (FIG. 2—step 6). Then the instance of OSGi bundle is published in to the SOA registry if there is no filter configured (step 3004). If the filtering for the OSGi bundle is configured then the OSGi bundle that passes through the filtering configuration will be published in to the SOA registry and governance is enabled (step 3005). Other OSGi bundles will not be published to the SOA registry.

If the instance of OSGi bundle is present in the SOA registry, the OSGi Agent bundle retrieves the corresponding OSGi bundle instance from the SOA registry (step 3006). Then the OSGi Agent bundle retrieves the governance configuration details (step 3007). If it is found then the state information of the instance of the OSGi bundle in the SOA registry is retrieved (2010). The state validation (step 2011) is done as described earlier in this document. If there is a conflict, the OSGi bundle state in the OSGi environment is changed per configuration (step 2007).

Then the instance of the OSGi bundle is updated with meta-data changes and state changes. Then the OSGi bundle is published in to the SOA registry (step 2008). If the event received is "UNINSTALLED" then the instance of the OSGi bundle in the SOA registry is deleted. Optionally, as described in FIG. 2—step 9, the OSGi Agent 12 bundle logs the publish information and sends an email notification to a configured email address or addresses (step 2009).

When the registered OSGI Service listener 15 receives the Service Event from the OSGi environment 10 (step 2000), it sends the ServiceEvent to the OSGi Agent bundle 12 (step 2001). The OSGi Agent 12 inquires the SOA registry to find out the instance of the OSGi service is already published in SOA registry (step 2002). If the instance of the OSGi Service is not present in the SOA registry then the OSGi Agent bundle transforms (step 2004) the OSGi service to the instance of the OSGi service in SOA registry as described earlier (FIG. 2—step 6). Then the instance of the OSGi service is published in to the SOA registry if there is no filter is configured (2005). If the filtering for the OSGi bundle is configured then the OSGi service that pass through the filtering configuration will be published in to the SOA registry and governance is enabled in the SOA registry (step 2006). Other OSGi services will not be published to the SOA registry.

If the instance of the OSGi service is present in the SOA registry, the OSGi Agent bundle retrieves the corresponding OSGi service instance from the SOA registry (step 2003). Then OSGi Agent bundle retrieves the governance configuration details. If it is found then the state information of the instance of the OSGi bundle in SOA registry is retrieved. The state validation of the OSGi service is done as described earlier. The state validation of the OSGi service includes the state validation of the owning OSGi bundle. If there is a conflict, the OSGi service and/or OSGi bundle state in the OSGi environment is changed as per the configuration.

Then the instance of the OSGi bundle is updated with meta-data changes and state changes. Then the OSGi bundle is published in to the SOA registry. If the event received is "UNREGISTERING" then the instance of the OSGi bundle in the SOA registry is deleted. Optionally, as described in FIG. 2—step 9, the OSGi Agent 12 bundle logs the publish information and sends an email notification to a configured email address or addresses.

Pre-Deployment Governance

In a further aspect of the present invention, governance can be applied to an OSGi bundle 14 and/or its OSGi services 13 even before the bundle is deployed in to the OSGi environment 10. For example, FIG. 4 describes that the development lifecycle of a bundle 14 can be governed using the SOA registry 21 and then the "Production" ready OSGi bundle 14 is deployed in the OSGi environment 10. In step 1, the object is created, followed by enabling of governance of the newly created object in step 2, and updating of the object in step 3. Steps 4 to 8 of FIG. 4 describe how a new OSGi bundle 14 is installed in the OSGi environment 10. Steps 9 to 12 describe how the update process of an OSGi bundle 14 instance or OSGi Service 13 instance in the SOA Registry 21 triggers an update of the OSGi bundle 14 or state change of the OSGi bundle 14 in the OSGi environment 10. Deletion of an OSGi bundle 14 instance in the SOA Registry 21 triggers an un-installation of the OSGi bundle 14 in the OSGi environment 10.

Further Characteristics of Preferred Embodiments of the Invention

The OSGi bundle 14 jar is associated with the bundle instance in the SOA Registry 21. In a preferred embodiment, it is represented as JAXR model ExtrinsicObject. In FIG. 5, section 500 provides a <deploy> element which contains the following elements: the <SOARegistry> element specifies the state of the OSGi Bundle RegistryEntry instance that needs to be installed in the OSGi environment. The <Service> Element specifies the state of all the OSGi Service 13 instances of the OSGi Bundle 14 instance. Similarly, update, state-change and/or delete operations can also be configured.

In this example, the SOA Registry 21 triggers the deployment, update, and/or other operations in a "Push approach from the SOA Registry" (as explained further above), which can be configured in the SOA registry 21. As also explained further above, the "Pull approach from the OSGi Agent bundle" can also be configured.

Preferably, the Agent bundle 12 inquires the SOA registry 21 periodically to find out the OSGi bundle 14 instances that are in the configured Lifecycle state and/or Lifecycle stage. If the resulting bundles are not installed in the OSGi environment to, then those bundles were installed. Similarly, when a bundle is modified, then the OSGi Agent bundle 12 updates the OSGi bundle 14 in the OSGi environment 10. Similarly, state-change and/or deletion of OSGi bundles 14 can be done using the "Pull approach from the OSGi Agent bundle". The OSGi governance enforcement is then done as described earlier in FIG. 2.

In the OSGi environment to, multiple versions of the same bundle may be deployed. Preferably, a combination of a symbolic name and a version identifies the bundle uniquely in the OSGi environment 10. The OSGi Bundles 14 with the same symbolic name but with different versions are identified as different versions of an OSGi Bundle 14. In such cases, each version is created as an OSGi Bundle 14 instance with corresponding version and is published to the SOA Registry 21. Each version of the OSGi Bundle 14 metadata is mapped to the corresponding version of the OSGi bundle 14 instance in the SOA registry 21. The update operation in the OSGi Bundle 14 with a specific version triggers an update of the same version of the OSGi bundle 14 instance in the SOA registry 21. The un-install operation of a bundle with a specific version deletes the version of the OSGi Bundle 14 instance and the bundle's OSGi Service 13 instances in the SOA Registry 21. The registered OSGi services 13 of an OSGi Bundle 14 are created as versioned OSGi Service 13 instances in the SOA registry 21 with the same version as the OSGi Bundle's 14 version.

Exemplary Mapping Between OSGi Meta-Data and SOA Meta-Data

| OSGi Object | OSGi representation | Preferred SOA registry representation |
|---|---|---|
| OSGi Bundle | Bundle-Name header | Name of the instance of OSGi object type represented by InternationalString |
| | Bundle-Description header | Description of the instance of OSGi object type represented by InternationalString |
| | Bundle-Version header | Version of the instance of OSGi object type |
| | Bundle-ActivationPolicy header | Key-value(s) pair represented by Slot |
| | Bundle-Activator header | Key-value(s) pair represented by Slot |
| | Bundle-Category header | Key-value(s) pair represented by Slot |
| | Bundle-Classpath header | Key-value(s) pair represented by Slot |
| | Bundle-ContactAddress header | Key-value(s) pair represented by Slot |
| | Bundle-Copyright header | Key-value(s) pair represented by Slot |
| | Bundle-DocURL header | ExternalLink pointing to the given documentation link |
| | Bundle-Icon header | One ExternalLink object for each of the URL listed. Size of the Icond is stored as key-value(s) pair represented by Slot in the corresponding ExternalLink object. |
| | Bundle-License header | Key-values(s) pair represented by Slot. If the optional URL is specified, then the URL will be represented using an ExternalLink object |
| | Bundle-Localization header | Key-value(s) pair represented by Slot |
| | Bundle-ManifestVersion header | Key-value(s) pair represented by Slot |

-continued

| OSGi Object | OSGi representation | Preferred SOA registry representation |
|---|---|---|
| | Bundle-NativeCode header | Key-value(s) pair represented by Slot |
| | Bundle-RequiredExecutionEnvironment header | Key-value(s) pair represented by Slot |
| | Bundle-SynmbolicName header | Key-value(s) pair represented by Slot |
| | Bundle-UpdateLocation header | ExternalLink pointing to the URL of the update location. |
| | Bundle-Vendor | Key-value(s) pair represented by Slot |
| | DynamicImport-Package header | Key-value(s) pair represented by Slot. Association objects are also created between the bundles as described below in the table |
| | Export-Package header | Key-value(s) pair represented by Slot. Association objects are also created between the bundles as described below in the table |
| | Export-Service header | Key-value(s) pair represented by Slot. Association objects are also created between the bundle and service as described below in the table |
| | Fragment-Host header | Key-value(s) pair represented by Slot. |
| | Import-Package header | Key-value(s) pair represented by Slot. Association objects are also created between the bundles as described below in the table |
| | Import-Service header | Key-value(s) pair represented by Slot. Association objects are also created between the bundle and service as described below in the table |
| | Provide-Capability header | Key-value(s) pair represented by Slot. Association objects are also created between the bundles as described below in the table |
| | Require-Bundle header | Key-value(s) pair represented by Slot. Association objects are also created between the bundles as described below in the table |
| | Require-Capability header | Key-value(s) pair represented by Slot. Association objects are also created between the bundles as described below in the table |
| | Other Manifest headers | URL is represented using ExternalLink Object. Files are represented using ExtrinsicObject. Dependencies are represented using Association object. Others will be represented as Key-value(s) pair represented by Slot. |
| | Custom headers and values as key/value pairs | Key-value(s) pair represented by Slot. |
| | Security headers | Key-value(s) pair represented by Slot. |
| | Bundle state in OSGi Environment | Key-value(s) pair represented by Slot. |
| | Requirements to other bundles using wiring | One Association object for each requirement from the OSGi Bundle 41. Source object of the Association is requirer bundle and target object of the Association is provider bundle with association type - 'Consumes' category |
| | Capabilities offered to other bundles using wiring | One Association object for each capability from the OSGi Bundle 41. Source object of the Association is provider bundle and target object of the Association is requirer bundle with association type - 'Consumed By' category |
| | Import Packages - bundles | Deprecated from OSGi Specification 4.3. Using PackageAdmin instance, we could retrieve the Exported packages of the given bundle. For each export package, there is an array of Importing Bundles. The association objects between the Exporting bundle and the importing bundles are created with association type - "Exports" category. |

-continued

| OSGi Object | OSGi representation | Preferred SOA registry representation |
|---|---|---|
| | Registered services | The name of the association object is the ExportPackage name. One Association object for each registered service from the OSGi Bundle 41. Source object of the Association is OSGi Bundle instance and target object of the Association is OSGi Service instance with association type - "Registers" |
| | Services in use | One Association object for each service that is being used by the OSGi Bundle 41. Source object of the Association is OSGi Bundle instance and target object of the Association is OSGi Service instance with association type - "Uses" |
| OSGi Bundle and OSGI Service | Lifecycle state and Lifecycle stage | Classification objects represents the Lifecycle state and Lifecycle stage information |
| | OSGi environment | The OSGi entities from an OSGi environment can be identified using associations. The published OSGi bundles and OSGi Services have association with OSGi environment instance in SOA Registry. The association type is 'Installed" category. |
| OSGi Service | Value of the key service.id | Name of the OSGi Service instance |
| | Value of the key service.description | Description of the OSGi Service instance |
| | Other properties | Slot object |
| | Bundles that are using the service | One Association object for each bundle that is using the OSGi Service 42. Source object of the Association is OSGi Service instance and target object of the Association is OSGi Bundle instance with association type - "Uses" |

SUMMARY

In summary, certain exemplary embodiments generally deal with enforcing SOA governance for OSGI bundles. While the OSGI standard provides for most issues involved with the delivery, installation, lifecycle management, identification etc. of OSGI bundles and OSGI Services it does so in a self-contained manner without reference to any SOA governance being dictated by the SOA registry. Certain exemplary embodiments overcome this issue by deploying an Agent bundle in (multiple) OSGI environments within the SOA landscape. The Agent(s) uses the OSGI listening API to detect new/changed OSGI bundles and then establishes a corresponding object (type OSGI object) as part of the centralized SOA registry. In this preferred embodiment the full governance provided for in the centralized SOA registry can be enforced on the OSGI bundles.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium. For instance, the example SOA and/or OSGi environment may include or be controlled by at processing resources such as, for example, at least one processor and a memory. The registries, objects, lists, messages, etc., discussed herein may be stored in connection with transitory or non-transitory computer readable storage media. In certain example embodiments, the OSGi Service Gateway Architecture may be leveraged and thus certain example embodiments may include, for example, a hardware level (e.g., including processors, a memory, disk, etc.), an operating system running on the hardware level, the Java Virtual Machine running via the operating system, modules of code that support the functions described herein, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for integrating at least one Open Services Gateway initiative (OSGi) environment into a Service-oriented Architecture (SOA), wherein the OSGi environment comprises a plurality of OSGi objects registered into an OSGi service registry of the OSGi environment, the plurality of OSGi objects including a first OSGi object and s second OSGi object, wherein the SOA comprises a SOA registry, the method comprising:
   publishing, in cooperation with at least one processor, the first OSGi object to the SOA registry by creating an SOA object in the SOA registry that is an instance of the first OSGi object;

in accordance with the publishing, identifying a relationship between the first OSGi object and the second OSGi object;

storing, to the SOA registry, information reflecting at least the identified relationship between the first OSGi object and the second OSGi object within the OSGi environment;

enforcing governance on the first OSGi object and the second OSGi object in the OSGi environment by at least using the stored information reflecting the identified relationship between the first OSGi object and the second OSGi object.

2. The method of claim 1, wherein the first OSGi object comprises lifecycle data of the first OSGi object, and wherein the created SOA object comprises lifecycle data the created SOA object.

3. The method of claim 1, wherein the first OSGi object comprises information indicating a version of the first OSGi object, and wherein the created SOA object comprises information indicating the version of the first OSGi object.

4. The method of claim 1, further comprising: detecting that a third OSGi object has been installed in the OSGi environment; and responsive to detecting that the third OSGi object has been installed, creating a corresponding SOA object in the SOA registry.

5. The method of claim 4, wherein the detecting comprises receiving an event from the OSGi environment indicating that the third OSGi object has been installed in the OSGi environment.

6. The method of claim 1, further comprising: detecting that a third OSGi object has been updated in the OSGi environment; and responsive to detecting that the third OSGi object has been updated, updating a corresponding SOA object in the SOA registry.

7. The method of claim 6, wherein the detecting comprises receiving an event from the OSGi environment indicating that the third OSGi object has been updated in the OSGi environment.

8. The method of claim 1, further comprising: detecting that a third OSGi object has been uninstalled in the OSGi environment; and responsive to detecting that the third OSGi object has been uninstalled, deleting a corresponding SOA object in the SOA registry.

9. The method of claim 8, wherein the detecting comprises receiving an event from the OSGi environment indicating that the third OSGi object has been uninstalled in the OSGi environment.

10. The method of claim 1, further comprising at least one of:
    (1) detecting that the SOA object has been created in the SOA registry, and responsive to detecting the creation of the SOA object, installing the first OSGi object in the OSGi environment;
    (2) detecting that the SOA object has been updated in the SOA registry, and responsive to detecting the update of the SOA object, updating the first OSGi object in the OSGi environment in accordance therewith; and
    (3) detecting that the SOA object has been deleted from the SOA registry, responsive to detecting the deletion of the SOA object, uninstalling the first OSGi object in the OSGi environment.

11. The method of claim 10, wherein the detecting that the SOA object has been (1) created, (2) updated, or (3) deleted further comprises receiving a command from the SOA registry.

12. The method of claim 10, wherein the detecting that the SOA object has been (1) created, (2) updated, or (3) deleted further comprises querying the SOA registry.

13. The method of claim 12, wherein the querying is performed periodically.

14. The method of claim 1, wherein the first OSGi object is an OSGi bundle and the second OSGi object is an OSGi service.

15. The method of claim 1, further comprising detecting a change in the OSGi environment regarding the first OSGi object,
    wherein the publishing of the first OSGi object to the SOA registry is performed in response to the detected change in the OSGi environment regarding the first OSGi object.

16. A non-transitory computer readable medium storing a computer program for use with a computer system that includes at least one processor, the computer program comprising instructions configured to cause the computer system to:
    integrate at least one Open Services Gateway initiative (OSGi) environment into a Service-oriented Architecture (SOA), wherein the OSGi environment comprises a plurality of OSGi objects registered into an OSGi service registry of the OSGi environment, the plurality of OSGi objects including a first OSGi object and s second OSGi object, wherein the SOA comprises a SOA registry;
    detect a change in the OSGi environment regarding the first OSGi object;
    responsive to detecting the change in the OSGi environment regarding the first OSGi object, publish, in cooperation with the at least one processor, the first OSGi object to the SOA registry by creating an SOA object in the SOA registry that corresponds to the first OSGi object;
    in accordance with the detection of the change, determine a relationship between the first OSGi object and the second OSGi object;
    store, to the SOA registry, information reflecting at least the identified relationship between the first OSGi object and the second OSGi object within the OSGi environment; and
    enforce governance on the plurality of OSGi objects in the OSGi environment by at least using the stored information reflecting the identified relationship between the first OSGi object and the second OSGi object.

17. A computer system comprising:
    a non-transitory electronic storage configured to store:
        an Open Services Gateway initiative (OSGi) registry for an OSGi environment, the OSGi registry having a plurality of OSGi objects registered therein, the plurality of OSGi objects including a first OSGi object and a second OSGi object, and
        an Service-oriented Architecture (SOA) registry; and
    at least one hardware processor configured to:
        determine that a change has occurred in the OSGi registry regarding the first OSGi object;
        responsive to the determination, publish, in cooperation with the at least one hardware processor, the first OSGi object to the SOA registry by creating an SOA object in the SOA registry that is an instance of the first OSGi object;
        in accordance with the detecting, identify a relationship between the first OSGi object and the second OSGi object;

store, to the SOA registry, information reflecting at least the identified relationship between the first OSGi object and the second OSGi object within the OSGi environment; and enforce governance on the plurality of OSGi objects in the OSGi environment by at least using the stored information reflecting the identified relationship between the first OSGi object and the second OSGi object.

18. The system of claim 17, wherein the at least one hardware processor is further configured to perform at least one of:

(1) detect that another OSGi object has been installed in the OSGi environment, and in response to the detection of the installation of the another OSGi object, create a corresponding SOA object in the SOA registry in accordance therewith;

(2) detect that another OSGi object has been updated in the OSGi environment, and in response to the detection of the update of the another OSGi object, update a corresponding SOA object in the SOA registry in accordance therewith;

(3) detect that another OSGi object has been uninstalled from the OSGi environment, and in response to the detection of the uninstallation of the another OSGi object, delete a corresponding SOA object in the SOA registry in accordance therewith;

in response to the detection of the installation, the update, or the uninstallation of the another OSGi object, creating, updating, or deleting the corresponding SOA object in the SOA registry in accordance therewith.

\* \* \* \* \*